March 18, 1924. 1,487,402

E. ROUCKA

FLUID FLOW MEASURING DEVICE

Filed Sept. 30, 1922 2 Sheets-Sheet 1

INVENTOR
Erich Roucka,
BY
Everett H Rook,
ATTORNEYS.

March 18, 1924. 1,487,402

E. ROUCKA

FLUID FLOW MEASURING DEVICE

Filed Sept. 30, 1922  2 Sheets-Sheet 2

Patented Mar. 18, 1924.

1,487,402

UNITED STATES PATENT OFFICE.

ERICH ROUCKA, OF BLANSKO, CZECHOSLOVAKIA.

FLUID-FLOW-MEASURING DEVICE.

Application filed September 30, 1922. Serial No. 591,500.

*To all whom it may concern:*

Be it known that I, ERICH ROUCKA, a citizen of the Republic of Czechoslovakia, and a resident of Blansko, Czechoslovakia, have invented new and useful Improvements in Fluid-Flow-Measuring Devices, of which the following is a specification.

This invention relates in general to fluid flow measuring devices of the balanced type. Such a device comprises means sensitive to a fluid condition, such as pressure, pressure difference, etc., caused by the flow of fluid, means cooperating with said sensitive means to maintain balance in the device, and governor mechanism for said second-mentioned means.

The primary object of the invention is to provide in such a device means for increasing the sensitivity or accuracy thereof by reducing friction between relatively movable slidably cooperating parts.

A further object of the invention is to provide in such a device means for producing slight relative movements or vibrations of the said relatively movable slidably cooperating parts independently of their controlling movements to reduce friction therebetween.

The invention contemplates the producing of vibrations or slight relative movements in the sensitive means, the stuffing boxes, the governor, or in all slidably engaging parts, and said movements or vibrations may be produced mechanically, by fluid, electrical or other suitable means. Where liquid, such as mercury, is used as the sensitive means, it may also be vibrated.

Figure 1:
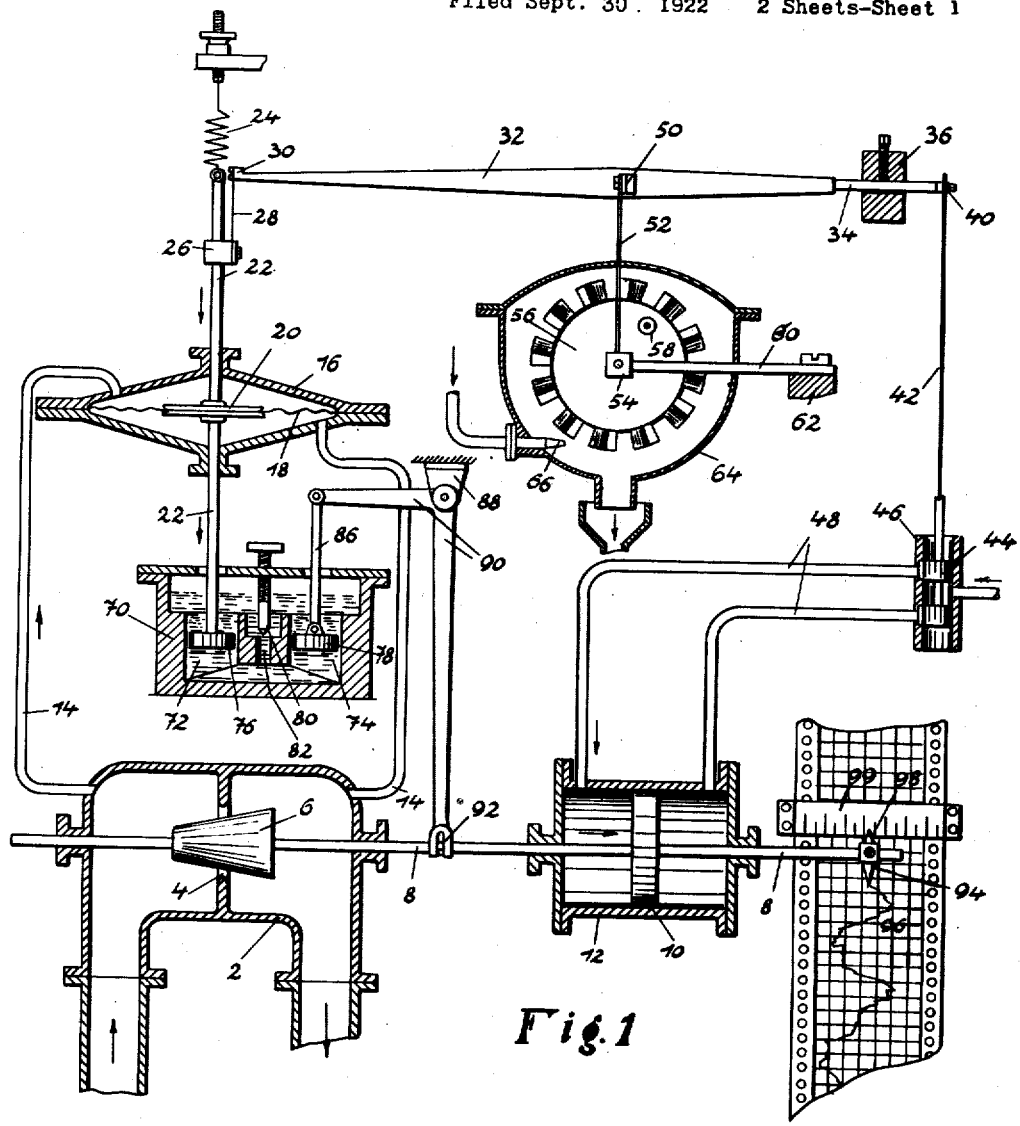
Figure 2:
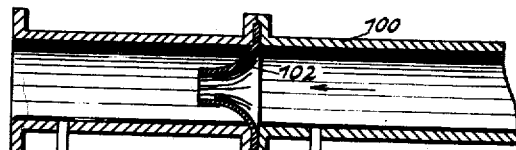
Figure 2:
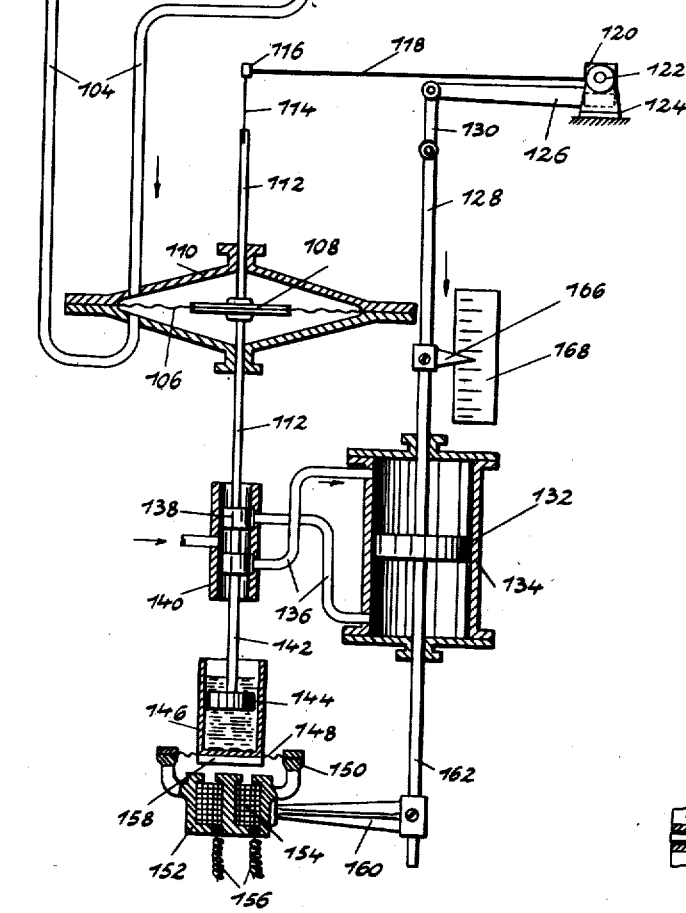
Figure 3:
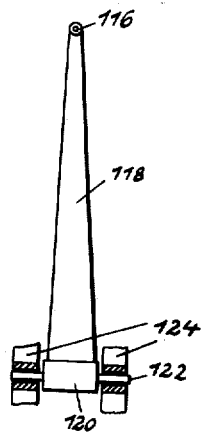

Referring to the accompanying drawings, in which like numerals of reference indicate the same parts throughout the several views, Figure 1 is a diagrammatic sectional illustration of a fluid flow measuring device embodying my invention;

Figure 2 is a similar illustration of another fluid flow measuring system embodying a modified form of my invention, and Figure 3 is a fragmentary plan view of the balancing mechanism shown in Figure 2.

In Figure 1 of the drawings is illustrated a device for measuring the flow of fluid including a lever 32 mounted intermediate its ends at 50 on a flexible strip 52 and which has one end thereof connected at 30 by a flexible strip 28 to one end of the diaphragm rod 22 of a diaphragm 18 mounted in a diaphragm chamber 16. The diaphragm rod and the corresponding end of the lever 32 are connected by a spring 24 and an adjusting screw to a fixed support so that the diaphragm is balanced by said spring. Pipes 14 connect the diaphragm chamber 16 at opposite sides of the diaphragm 18 to opposite sides of a flow resisting device 6 mounted in a conduit 2 provided with an orifice 4 through which flows a fluid. The flow resisting device 6 is mounted on a rod 8 to which is also connected a piston 10 mounted in a cylinder 12 of a fluid motor for actuating the flow resisting device 6. Actuation of the said fluid motor is controlled through a governor valve comprising a valve piston 44 mounted in a cylinder 46, by actuation of the diaphragm 18 by differences in pressure in the conduit 2 at opposite sides of the orifice 4. The valve piston 44 is connected by a member 42 to the end 40 of the lever 32 opposite the diaphragm rod 22. Upon differences in pressure in the conduit 2 at opposite sides of the flow resisting device, the diaphragm 18 is actuated in one direction and oscillates the lever 32 so as to move the valve 44 in one direction and permit flow of fluid through pipes 48 to one side of the piston 10 and from the other side thereof. The flow resisting device 6 is thus moved by the piston 10.

A yielding return device is provided to prevent overthrowing in the system, said device comprising a bell crank lever 90 pivotally connected to a fixed support 88, one arm of said lever having a pin and slot connection 92 with the rod 8 and the other arm being connected to a piston 78 mounted in a cylinder 74 connected at its inner end by a passage to a similar cylinder 72 in which is mounted a piston 76 connected to the rod 22 carried by the diaphragm 18. The cylinders 74 and 72 are carried by a casing 70 and contain a liquid in which the pistons 76 and 78 are movable. When the piston 10 moves in one direction the piston 78 is actuated and through the liquid in the casing 70 tends to return the piston 76 and in turn the diaphragm 18 to its neutral position. A valve 80 is provided for controlling the flow of liquid through a by-pass 82 from the passage between the cylinders 74 and 72 and thus varying the amount of influence of the piston 78 on the piston 76. The piston rod 8 carries a pointer 98 and pen 94 which cooperate with the respective scale and record strip 99 and 96 to indicate and record the flow of fluid through the conduit 2.

To produce slight relative movements or vibrations in the slidably engaging parts of the device, a rotor 56 of a fluid turbine having buckets or vanes on its periphery may be mounted on a shaft journaled in bearings 54 in one end of a flexible or resilient bar 60, the other end of which is connected to a fixed support 62. A casing 64 surrounds the rotor 56, and the free end of the bar 60 is connected to the comparatively more flexible or resilient strip 52 which is connected at 50 to the lever 32 intermediate its ends. The rotor 56 carries an eccentrically positioned weight 58, and is driven by a liquid directed against the vanes by means of a nozzle 66.

In the operation of the device, when the rotor is revolved by impact of the liquid from the nozzle 66 against the vanes, the eccentric weight 58 causes the rotor and casing to flex the bar 60 and strip 52 so that the rotor, casing 64 and nozzle 66 vibrate in the directions indicated by the arrows. The bar 60 reduces vibration of the device in all other directions. This vibration is produced by the constant swinging of the weight 58 from one side of the shaft to the other so as to maintain the rotor in an unbalanced condition.

The vibrations produced by the rotor 56 are transmitted through the strip 52 and lever 32 to the diaphragm rod 22. The vibrations are then transmitted from the piston 76 through the fluid in the casing 70 and the piston 78 to the rod 8. The friction between the rod 22 and the diaphragm chamber 16, between the rod 8 and piston 10 and cylinder 12, and between the valve piston 44 and cylinder 46 is reduced so that all of the movable parts are extremely sensitive and quickly respond to actuation during the controlling movements. For causing a definite relation between the vibration of the diaphragm rod 22 and the member 42 connecting the lever 32 and valve piston 44, the end of the lever 32 connected to said valve piston is provided with an adjustable weight 36.

Figure 2 illustrates another fluid flow measuring device in which the fluid to be measured flows through a conduit 100 in which is arranged a fluid flow resisting device 102. The said conduit 100 is connected at opposite sides of the flow resisting device 102 by pipes 104 to a diaphragm casing 110 at opposite sides of a diaphragm 106. With this construction the diaphragm 106 is sensitive to or actuated by differences in pressure of the fluid in the conduit 100 caused by the flow of the fluid through the flow resisting device 102.

The action of the fluid pressure on the diaphragm 106 is balanced by the force of a resilient strip 118 one end of which is connected at 116 by a resilient member 114 to a rod 112 connected to the diaphragm 106. The other end of said resilient strip 118 is provided with a trunnion carrying portion 120 having trunnions 122 mounted in suitable fixed bearings 124, and said portion 120 of the resilient strip is provided with an arm 126 arranged parallel to the strip and connected at its free end by a link 130 to the piston rod 128 of a fluid motor controlled by a governor mechanism actuated by the diaphragm 106.

The diaphragm rod 112 is connected to a piston valve 138 mounted in a cylinder 140 of a governor valve which controls the flow of fluid through pipes 136 to and from said fluid motor which comprises a piston 132 mounted in a cylinder 134. Upon differences in pressure in the conduit 100 at opposite sides of the flow resisting device 102, the diaphragm 106 is actuated in one direction or the other and in turn moves the valve piston 138 to admit fluid from a supply pipe to one side of the piston 132 of the fluid motor and from the other side thereof. The said piston 132 is thus moved in one direction and tends to swing the resilient strip 118 about its pivot 122 against the resistance of the diaphragm 106. The tension of said strip 118 is thus varied and balances the pressure actuating the diaphragm 106. The piston rod 128 may be provided with a pointer 166 cooperating with a scale 168 to indicate the flow of fluid through the conduit 100.

To produce relative movements or vibrations in the relatively movable slidably cooperating parts of the device, I may provide a cylinder 146 mounted on a flexible diaphragm 148 in a fixed support 150 and containing a liquid, such as oil or glycerine, in which is mounted a piston 144 connected by a rod 142 to the governor valve piston 138. The support 150 is mounted by an arm 160 on a rod 162 projecting from the piston 132, and carries an electro-magnet 152 including the coil 154 which is connected by wires 156 to a source of alternating or interrupted electric current. The said electro-magnet cooperates with an armature plate 158 secured to the diaphragm 148 beneath the cylinder 146, and with this construction the armature 158 is rapidly alternately attracted and repulsed by the electro-magnet so as to vibrate the diaphragm 148 and the cylinder 146. These vibrations are transmitted by the liquid in said cylinder 146 and the piston 144 to the valve piston 138 of the governor valve and the rod 112 so as to reduce friction between said parts and their slidably cooperating parts, the cylinder 140 and diaphragm casing 110, respectively. Said vibrations are also transmitted through the diaphragm 148 to the support 150 and rod 162 and thence to the piston 132, whereby the said rod 162, the piston 132, and the rod 128 are vibrated. These vibrations reduce friction between the said parts and render the same extremely sensitive and quickly responsive to the controlling movements.

It will be observed that the liquid in the cylinders 72, 74 and 146 form a part of the respective vibration transmitting means, and that while the liquid may be vibrated or displaced by vibration of the respective pistons 76 and 78 and cylinder 146, they are not inherently elastic or resilient in the direction of movement of the vibrated parts but rather are rigid or unyielding. Therefore, the said liquid prevents or reduces any back-lash or rebounding of the vibrated parts, but at the same time is susceptible of transmitting vibrations through the capability of displacement of the liquid in directions other than those of the vibrations.

It will be noted that the support 150 and cylinder 146 move with the piston 132 in a direction opposite to the movement of the diaphragm 106, so that the liquid in the said cylinder 146 tends to restrain movement of the diaphragm and the governor valve piston 138 to prevent overthrowing or hunting of the governor valve.

While I have shown a plurality of devices for producing and transmitting vibrations it will be understood that this is only for the purpose of illustrating the principles of the invention, and that many modifications and changes can be made in the details of construction of the device without departing from the spirit or scope of the invention. Therefore, I do not wish to be understood as restricting myself except as required by the following claims when construed in the light of the prior art.

Having thus described the invention, what I claim is:

1. A fluid flow measuring device, comprising a fluid flow resisting means, means sensitive to a fluid condition caused by the flow of fluid through said flow resisting means, means to cooperate with said sensitive means to maintain balance in the device, governor mechanism for said second-mentioned means and actuated by said first-mentioned means, and means for producing slight relative motion of the relatively movable slidably cooperating parts of the device independently of the controlling movements to reduce friction therebetween.

2. A fluid flow measuring device, comprising a fluid flow resisting means, means sensitive to a fluid condition caused by flow of fluid through said flow resisting means, a pilot motor, means actuated by said pilot motor and movable according to the magnitude of the flow of fluid, a governor actuated by said first-mentioned means for controlling said motor, and means for producing slight relative motion of the relatively movable slidably cooperating parts of the device to reduce the friction therebetween.

3. A fluid flow measuring device, comprising a fluid flow resisting means, means movable according to the magnitude of the flow of fluid through said flow resisting means, a pilot motor for actuating said second-mentioned means, a governor for controlling said motor, means sensitive to fluid conditions caused by the flow of fluid through said flow resisting means for actuating said governor, and means for producing slight relative motion of the relatively movable slidably cooperating parts in the device to reduce the friction therebetween.

4. A fluid flow measuring device, comprising a variable fluid flow resistance means, means movable according to the magnitude of the flow of fluid through said variable flow resistance means, a pilot motor for actuating said first-mentioned and second-mentioned means, a governor for controlling said motor, means sensitive to a fluid condition caused by the flow of fluid through said flow resisting means for actuating said governor, and means for producing slight relative motion of the relatively movable slidably coperating parts in the device to reduce the friction therebetween.

5. A fluid flow measuring device, comprising a variable fluid flow resistance means, means movable according to the magnitude of the flow of fluid through said variable flow resistance means, a pilot motor for actuating said first-mentioned and second-mentioned means, a governor for controlling said motor, means sensitive to a fluid condition caused by the flow of fluid through said flow resisting means for actuating said governor, and means for vibrating the relatively movable slidably cooperating parts in the device to reduce the friction therebetween.

6. A fluid flow measuring device, comprising a variable fluid flow resistance means, means movable according to the magnitude of the flow of fluid through said variable flow resistance means, a pilot motor for actuating said first-mentioned and second-mentioned means, a governor for controlling said motor, means sensitive to a fluid condition caused by the flow of fluid through said flow resisting means for actuating said governor, and means for producing slight relative motion by means of fluid energy of the relatively movable slidably cooperating parts in the device to reduce the friction therebetween.

7. A fluid flow measuring device, comprising a fluid flow resisting means, means sensitive to a fluid condition caused by flow of fluid through said flow resisting means, a pilot motor, means actuated by said pilot motor and movable according to the magnitude of the flow of fluid, a governor actuated by said second-mentioned means for controlling said motor, means for producing vibrations, and means for transmitting said vibrations to the relatively movable slidably cooperating parts of the device to reduce friction therebetween, said vibration transmitting means being substantially non-resilient in the directions of said vibrations and displaceable in other directions to eliminate back-lash of the vibrated parts.

E. ROUCKA.

Certificate of Correction.

It is hereby certified that in Letters Patent No. 1,487,402, granted March 18, 1924, upon the application of Erich Roucka, of Blansko, Czechoslovakia, for an improvement in " Fluid-Flow-Measuring Devices," errors appear in the printed specification requiring correction as follows: Page 1, after line 48, insert the paragraph

*In illustrating the principles of the invention, I have shown and described fluid flow measuring devices and vibration producing means both embodying certain novel details of construction, but these details of construction are not herein specifically claimed for the reason that they are described and claimed in my copending applications Serial No. 420,787, filed October 30, 1920, Serial Nos. 575,755 and 575,750, both filed July 17, 1922.;* page 3, line 51, claim 1, for the compound word " second-mentioned " read *third-mentioned;* same page and claim, line 52, and line 65, claim 2, for the compound word " first-mentioned " read *second-mentioned;* and that the said Letters Patent should be read with these corrections therein that the same may conform to the record of the case in the Patent Office.

Signed and sealed this 13th day of May, A. D. 1924.

[SEAL.]
KARL FENNING,
*Acting Commissioner of Patents.*